Figure 1:
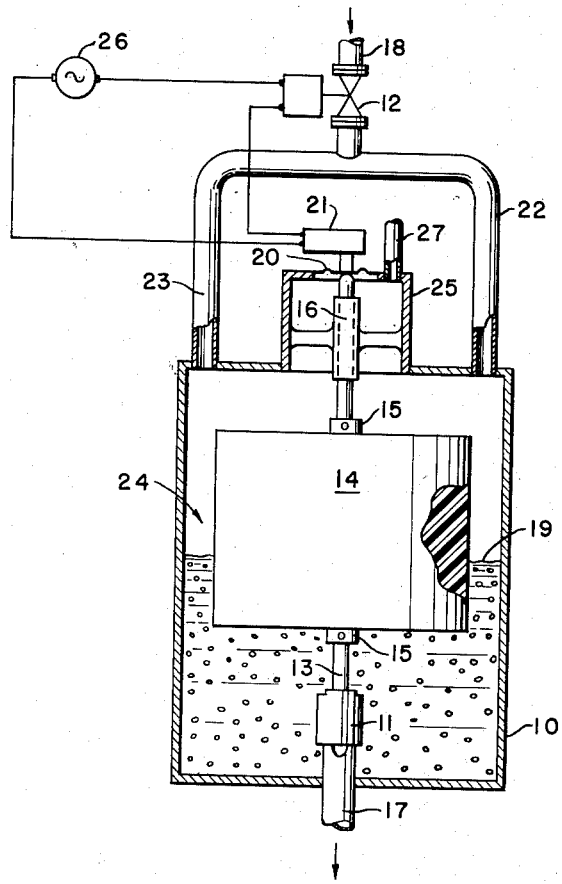

Dec. 31, 1963   J. I. GATES   3,116,133
HYDROCARBON SEEP DETECTION SEPARATOR
Filed Nov. 14, 1960

INVENTOR:
JOHN I. GATES
BY Theodore E. Bieber
HIS ATTORNEY

United States Patent Office 3,116,133
Patented Dec. 31, 1963

3,116,133
HYDROCARBON SEEP DETECTION SEPARATOR
John I. Gates, Pasadena, Calif., assignor to Shell Oil Company, New York, N.Y., a corporation of Delaware
Filed Nov. 14, 1960, Ser. No. 68,844
2 Claims. (Cl. 55—167)

This invention pertains to separators and more particularly to separators which are designed to separate a gas from liquid.

It has recently been suggested that offshore areas could be investigated for the location of petroleum deposits by detecting the presence of hydrocarbon gases in the seawater. In this type of investigation the gas dissolved in the seawater is separated and analyzed to determine whether hydrocarbon gases are present. In separating the dissolved gas in the seawater the separating equipment must be maintained free of hydrocarbons in order that the results obtained will accurately reflect the actual presence of hydrocarbon gases in the seawater. Thus, all of the equipment must be operated free of normal petroleum lubricants. Furthermore, it is necessary to maintain a constant volume of gas in the separator in order that the time interval between the taking of the sample and its analysis will be maintained constant. If the time interval is maintained constant one can easily correlate the record of the analysis with the geographical location in which the gas sample was taken. Another problem arises when salt water areas are investigated because the salt water tends to create a foam in the separator and thus some means must be provided for controlling it. In the separators used in the past, it has been the practice to introduce anti-foaming agents in order to control the foaming.

Accordingly, it is the principal object of this invention to provide a novel gas liquid separator which will maintain a constant volume of gas therein.

A further object of this invention is to provide a novel inlet system for introducing the gas liquid mixture into the separator which eliminates the tendency of certain liquids to foam in the separator while at the same time improving the separation of gas from the liquid.

A still further object of this invention is to provide a separator which has a relatively small gas volume in relation to the over-all size of the separator thus reducing the time lag between the introduction of the liquid into the separator and the removal of the gas.

The above objects and other advantages of this invention are achieved by providing a separator which utilizes a cylindrical container. The gas liquid mixture is introduced into the container through dual inlets which are disposed to introduce the mixture adjacent the side walls of the container at diametrically opposite points. The liquid level within the container is accurately controlled by a float controlled outlet and inlet valves. The combination of the float controlled outlet and inlet valves maintains a substantially constant liquid level within the container. The size of the float is made relatively large so that it substantially fills the volume of the container that exists above the liquid level. This greatly reduces the gas volume of the separator which improves its response to a change in the gas mixture. A gas collecting chamber is provided on top of the container in order that the gas separated from the liquid may be readily withdrawn without withdrawing the liquid.

Figure 2:
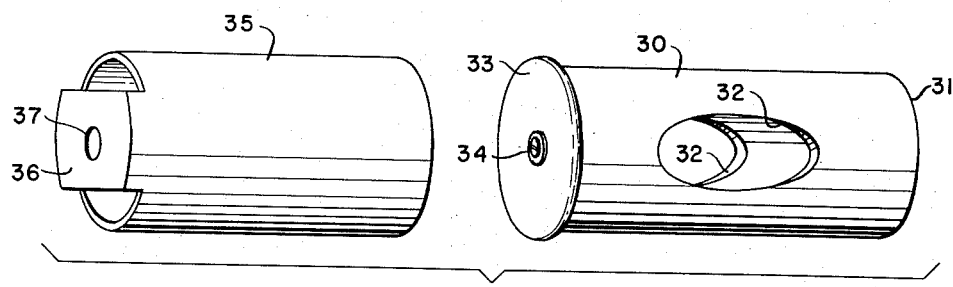

The above objects and other advantages of this invention will be more easily understood from the following detailed description of a preferred embodiment when taken in conjunction with the attached drawing in which:

FIGURE 1 is a perspective view of a separator constructed in accordance with this invention; and, FIGURE 2 is an exploded perspective view of the float controlled outlet valve used in the separator shown in FIGURE 1.

Referring now to FIGURE 1, there is shown a separator which utilizes a cylindrical container or housing 10. A float controlled outlet valve 11 is mounted in the lower end wall of the container 10 and communicates with an outlet or discharge pipe 17. The outlet or discharge pipe 17 is connected to a suitable pumping device which is capable of withdrawing the liquid from the container 10 under the high vacuum conditions that exist therein. A suitable pump is one marketed under the trade name "Moyno," which utilizes a helical rotor and a flexible spiral type of stator. This type of pump is a positive displacement pump which is capable of withdrawing liquid even from a region under high vacuum and in addition requires no lubrication.

A solenoid operated valve 12 is disposed in the inlet pipe of the container and is actuated by a microswitch 21 disposed on the top of the container. Both the float controlled valve and the microswitch 21 are actuated by the movement of a float number 14. The float member is provided with a central tube through which an actuating rod 13 passes. The actuating rod 13 is connected directly to the float controlled valve 11 and extends through the tube in the float 14 and guide 16 disposed in the gas collecting chamber 25. It operates the microswitch 21 through the movement of a flexible partition or diaphragm 20 in the upper end of a gas collecting chamber 25. The position of float member 14 on the actuating rod 13 is adjustable by means of collars 15 which thread on to the rod 13 and are locked in place by set screws.

As explained above, the float member 14 should be of substantial size so that it substantially fills the gas volume existing on the top of the liquid within the container 10. A large volume float in addition increases the force generated by the float and thus insures reliable operation of both the float controlled valve 11 and the microswitch 21. For example, in one separator a container 10 having an internal diameter of 6 inches and an over-all height of 12 inches utilized a float member having a diameter of 4 inches and an over-all length of 5 inches. Of course, position of the float should be adjusted to maintain the liquid level 19 near the top of the container 10, preferably to maintain the container two-thirds full of liquid.

The gas collecting chamber 25 is disposed in the top wall of the container 10 and has a flexible diaphragm 20 mounted in its upper end wall. As explained above, the microswitch 21 is disposed adjacent the flexible diaphragm 20 in order that it may be operated by the actuating rod 13 which bears against the lower side of the flexible diaphragm. An outlet tube 27 communicates with the interior of the gas collecting chamber 25 and is connected to a suitable vacuum pump. On vacuum pump system which has been used successfully is a carbon vane vacuum pump and a diaphragm pump utilizing a Teflon diaphragm, both pumps being capable of operating without requiring additional lubrication. Thus, no hydrocarbons will be introduced into the gas withdrawn from the separator. The microswitch 21 is coupled in series with a power supply, for example, an alternating current supply 26 in order to operate the solenoid valve 12.

The fluid inlet 18 is coupled to diametrically opposite inlets 22 and 23 in the container 10. The inlets 22 and 23 are disposed to admit the gas liquid mixture into the interior of the container 10 in the annular volume 24 which exists between the side walls of the container 10 and the float 14. It has been discovered that when a gas liquid mixture is admitted in this area the gas tends to separate readily from the mixture and form small bubbles which act as nuclei for the formation of large gas bubbles which may then escape from the mixture. When a single inlet was tried it caused the gas bubbles to swirl downwardly and out the outlet valve 11. Other types of inlets were also tried, such as fine sprays and inlet pipes having a series of small holes. None of these gave the results achieved with the dual inlets shown in FIGURE 1. In addition, by injecting the liquid gas mixture into the small annular volume 24, the tendency of the mixture to foam even in the case of sea water is greatly reduced.

Referring now to FIGURE 2, there is shown an exploded view of the float controlled outlet valve 11. The outlet valve uses a tubular valve body 30 which is closed at its upper end. The lower end 31 of the valve body is secured to the end wall of the container 10. In addition, the valve body is provided with two diametrically opposed openings 32. A guide member 33 is secured to the top wall of the valve body 30 by a fastening means 34 and is used to reduce the friction between the valve sleeve 35 and the valve body 30. The guide member 33 should be formed of a plastic material free of hydrocarbons and having a low coefficient of friction such as nylon or the like. The valve sleeve 35 is provided with a partially closed end 36 having an opening 37 to which the actuating rod 13 may be attached. The valve sleeve 35 should be a relatively close fit with the valve body 30 to minimize leakage between the sleeve 35 and the valve body.

When the above separator is operated the water gas mixture is caused to flow through the inlet 13 due to the difference between the low pressure atmosphere within the container and the atmospheric condition existing on the outside of the container. The water is introduced to the container through the dual inlets 22 and 23 and is jetted downwardly into the annular space 24 between the float 14 and the side wall of the container 10. This assists in separating the gas from the water and the small gas bubbles rise to the surface. At the surface they form nuclei for the formation of large gas bubbles which then escape from the liquid and are collected in the gas collecting chamber 25. The gas is removed from the chamber 25 by means of the outlet 27 which is connected to a vacuum pump. In order to insure a constant volume of gas and a steady liquid level within the container 10, both the float controlled valve 11 and solenoid valve 12 are actuated by the float 14. Under normal operating conditions the float controlled valve 11 alone will maintain the proper liquid level. In case of a change in normal operating conditions further upward movement of the float 14 will actuate the microswitch 27 to close the solenoid valve 12 to close the inlet valve 12. As explained above, it is very important that a constant liquid level and gas volume be maintained within the separator 10 in order that the record of the analysis of the gas removed from the separator may be accurately correlated with the geographical position from which the liquid sample was taken. This is especially important in offshore survey work where the sample of sea water is usually taken by a moving boat, thus the boat will move a considerable distance before the gas sample is actually analyzed. Accordingly it is very important that a means be available for correlating the analysis with the geographical position from which the sample was taken.

While but a single embodiment of this invention has been described in detail, many modifications and improvements can be made therein without departing from its broad spirit and scope.

I claim as my invention:

1. A separator for gas and liquid capable of maintaining a substantially constant volume of gas and liquid, said separator comprising: a closed vessel; a float controlled valve disposed in the lower wall of the vessel, said float controlled valve being connected to an outlet opening; an actuating rod attached to a float member and extending in opposite directions therefrom, one end of said actuating rod being attached to said float controlled valve, said float member having an overall dimension of at least one-half of the interior dimension of said vessel; two diametrically opposite inlets disposed in the upper wall of the vessel, said inlets being coupled to a single supply conduit, said inlets being disposed to distribute the fluid admitted to said vessel in the area between said float member and the interior wall of said vessel; a gas collecting chamber disposed on the upper wall of said vessel and communicating with the upper interior portion of said vessel, said gas collecting chamber having an outlet formed therein; the other end of said actuating rod bearing against a flexible partition disposed in a wall of said gas collecting chamber, an electrical switch disposed on the outside of said vessel adjacent said flexible partition and adapted to be actuated by movement thereof; said switch being coupled to an electrically operated valve to control the opening and closing thereof; said electrical operated valve being in said supply conduit to control the admission of fluid to said vessel through said dual inlets.

2. A separator for gas and liquid comprising: a closed cylindrical vessel; a float controlled outlet valve disposed in the bottom end wall of the vessel, said outlet valve communicating with an outlet opening formed in said bottom end wall and having a movable member for controlling the flow therethrough; an actuating rod attached to a float member and extending in opposite directions therefrom, one of said actuating rods being attached to the movable member of said outlet valve; said float member having an overall diameter of at least one half of the interior diameter of said vessel; two diametrically opposite inlet openings formed in top end wall of said vessel, said inlet openings being coupled to a common supply conduit, said inlet openings being disposed to distribute the fluid admitted to said vessel in the area between said float member and the wall of said vessel; a gas collecting chamber disposed on the top wall of the vessel and communicating with the interior thereof; an outlet opening formed in said gas collecting chamber; the other end of said actuating rod bearing against a flexible partition forming a part of the wall of said gas collecting chamber; an electrical switch disposed on the outside of said vessel to be actuated by movement of the flexible partition, said switch being coupled to an electrical operated valve to control the opening and closing thereof, said electrically operated valve being disposed in said supply conduit to control the admission of fluid to said vessel and the position of said float being adjusted on the actuating rod to maintain the vessel substantially two-thirds full of liquid.

References Cited in the file of this patent

UNITED STATES PATENTS

| | | |
|---|---|---|
| 1,654,261 | Jones | Dec. 27, 1927 |
| 1,711,428 | Schafer | Apr. 30, 1929 |
| 1,910,088 | Cherry | May 23, 1933 |
| 2,064,988 | Risser | Dec. 22, 1936 |
| 2,115,043 | Samiran | Apr. 26, 1938 |
| 2,555,452 | McIntyre | June 5, 1951 |
| 2,664,170 | Walker et al. | Dec. 29, 1953 |
| 2,811,219 | Wenzl | Oct. 29, 1957 |
| 2,885,118 | Remke | May 5, 1959 |
| 2,959,144 | Youtie | Nov. 8, 1960 |
| 3,050,008 | Pacey et al. | Aug. 21, 1962 |

OTHER REFERENCES

Eckman, D.: Industrial Instrumentation, New York, John Wiley and Sons, May 1953, page 262, FIGURE 9–15.